UNITED STATES PATENT OFFICE.

FLETCHER B. HOLMES, OF WOODBURY, NEW JERSEY, ASSIGNOR, BY MESNE ASSIGNMENTS, TO THE E. I. DU PONT DE NEMOURS POWDER COMPANY, OF WILMINGTON, DELAWARE, A CORPORATION OF NEW JERSEY.

STABLE EXPLOSIVE.

No. 891,420.  Specification of Letters Patent.  Patented June 23, 1908.

Application filed July 21, 1904. Serial No. 217,503.

*To all whom it may concern:*

Be it known that I, FLETCHER B. HOLMES, a citizen of the United States, residing at Woodbury, county of Gloucester, and State of New Jersey, have invented a new and useful Improvement in Stable Explosives, of which the following is a full, clear, and exact description.

The object of my invention is to produce a stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch a salt of oxalic acid containing ammonium. The mixing may be made in any manner to produce a good mixture. They may be mixed wet or dry and in any kind of a mixer. Preferably I mix the two in a finely divided powdered condition in a bowl provided with stirrers or paddles. Preferably I use an ammonium salt of oxalic acid and of such salts I prefer to use the neutral ammonium oxalate $COONH_4$—$COONH_4$.

The salts of oxalic acid containing ammonium which I can use include also the double salts containing ammonium, such as sodium ammonium oxalate $COONa$—$COONH_4$, potassium ammonium oxalate $$COOK-COONH_4.$$

Also I can use the acid ammonium oxalate $COOH$—$COONH_4$ instead of the neutral ammonium oxalate. The term ammonium oxalate is used by me to include all of these.

The stabilizing reagent is mixed with the nitrated starch produced in the ordinary well known manner.

The amount of the reagent I have used is from one-half of one percent. to twenty percent. More preferably, I use from two to twenty percent. and most preferably from two to five percent.

Having now fully described my invention, what I claim and desire to protect by Letters Patent is:—

1. A stable nitrated starch consisting of a mixture of nitrated starch and ammonium oxalate.

2. A stable nitrated starch consisting of a mixture of nitrated starch and from two to twenty percent. ammonium oxalate.

3. A stable nitrated starch consisting of a mixture of nitrated starch and from two to five percent. of ammonium oxalate.

4. A stable nitrated starch consisting of a mixture of nitrated starch and neutral ammonium oxalate.

5. A stable nitrated starch consisting of a mixture of nitrated starch and from two to five percent. of neutral ammonium oxalate.

6. A stable nitrated starch consisting of a mixture of nitrated starch and from two to twenty percent. of neutral ammonium oxalate.

In testimony of which invention, I have hereunto set my hand, at Philadelphia, on this 20th day of July, 1904.

FLETCHER B. HOLMES.

Witnesses:
M. M. HAMILTON,
WILLIAM B. MARKS.